Sheet 1 - 2 Sheets.
W. N. Whiteley.
Mower.
N° 84399
Patented Nov. 24, 1868.
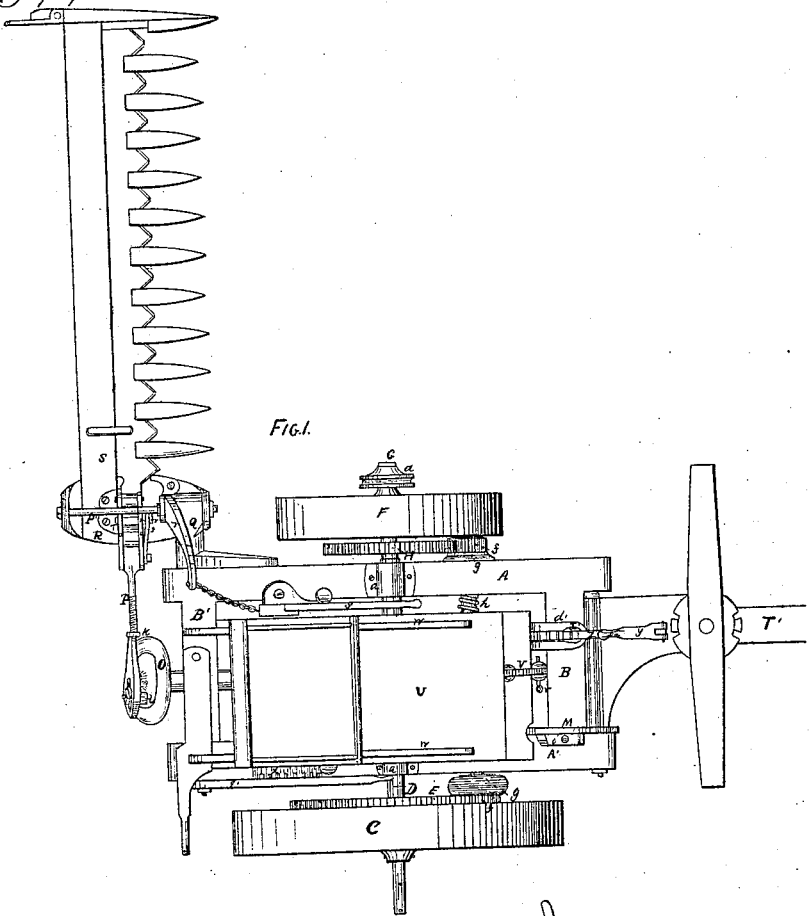
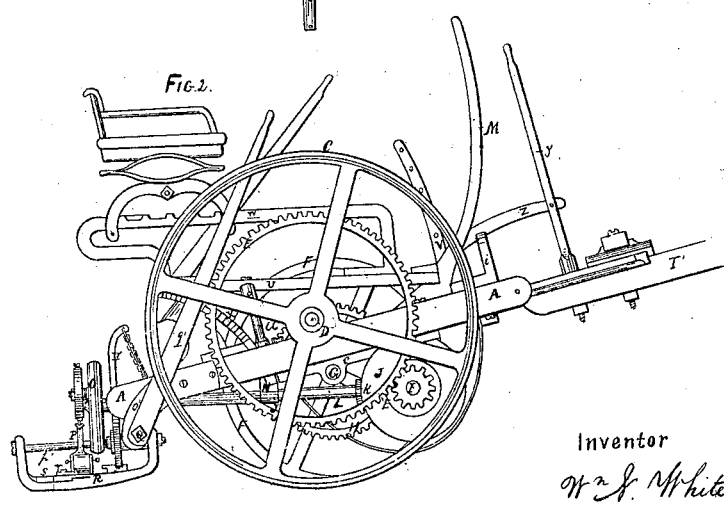
Witnesses.
Inventor
Wm N. Whiteley
By his atty R. D. O. Smith

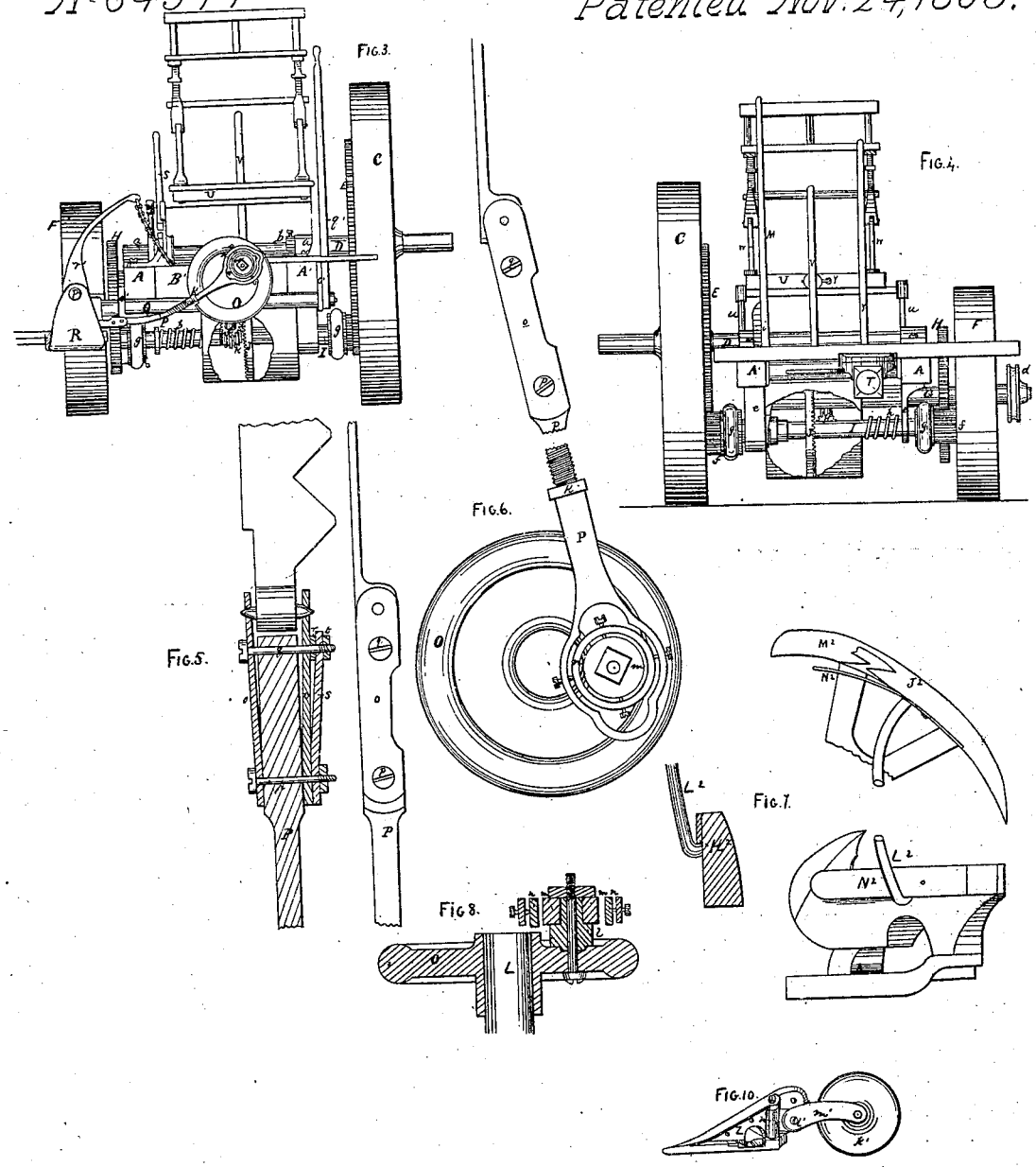

UNITED STATES PATENT OFFICE.

WILLIAM N. WHITELEY, OF SPRINGFIELD, OHIO.

IMPROVEMENT IN HARVESTERS.

Specification forming part of Letters Patent No. 84,399, dated November 24, 1868.

*To all whom it may concern:*

Be it known that I, WILLIAM N. WHITELEY, of Springfield, in the county of Clarke and State of Ohio, have invented a new and useful Improvement in Harvesters; and I do hereby declare the following to be a full, clear, and exact description of the same, reference being had to the accompanying drawings, in which—

Figure 1 represents a plan view of my machine when used as a mower; Fig. 2, a side elevation of the same; Fig. 3, a rear elevation of the same; Fig. 4, a front elevation of the same; Fig. 5, the manner of connecting the pitman with the cutter-bar; Figs. 6 and 8, side view and section of pitman-connection with crank-wheel; Fig. 7, a plan, elevation, and section of guiding apparatus for automatic rake when used in reaping; Fig. 10, side elevation of the outer caster-wheel; and Fig. 9, perspective view of the whole machine when prepared for mowing.

The frame of this machine is of wood, and consists of two pieces, of proper size, joined near the ends by other pieces at right angles, firmly secured, the whole forming a rectangle whose length is about twice its breadth. Standing behind the cutting apparatus, and facing it, those parts on the right of the center I call the "right" and those on the left hand the "left." These pieces, forming the frame, are represented plainly in Fig. 1, and are designated A, A', B, and B'. On the top of the side pieces A and A', and near the center of each, are placed the boxes $a$ and $a'$, through which the shaft of the main driving-wheel C passes. This shaft D is firmly attached to the wheel, so as to turn with it, and is put into the boxes from the outside, and firmly secured in its proper place by the screw-collar $b$ passing around it just inside of the box $a'$. To the inner side of the arms of this driving-wheel C is fastened the gear-wheel E, which drives the mechanism of the cutters. The shaft D extends outward from the wheel C, so as to admit of pulleys being placed upon it when the machine is used as a reaper. To the under side of the beams A and A', and directly under the boxes $a$ and $a'$, are secured the boxes $c\ c'$, (shown in Fig. 2,) through which the shaft of the wheel F passes. This shaft G is firmly secured to the wheel F, and turns with it. It is put through the boxes, and is secured by a collar on it, just inside the box $c$, in the same manner as the shaft D.

To the inner side of the arms of the wheel F is fastened the gear-wheel H, which, together with the gear-wheel E, drives the mechanism of the cutters.

The shaft G extends beyond the wheel F sufficiently to allow of a pulley, $d$, being placed upon it when the machine is used as a reaper.

The wheel F is considerably smaller than the wheel C, and the gear-wheel H upon it has the same proportion to the gear-wheel E that the wheel F has to the wheel C. This is necessary in order that they may both work equally upon the cutting mechanism while the machine is being driven straight ahead, and that when turning either to the right or left either wheel will singly drive the cutters, while the other may be standing still, or even turning backward. By making the wheel F smaller, I obtain sufficient room to work the reel, and am enabled to use one of less diameter.

The gear-wheels H and E mesh into pinions upon the shaft I, upon which, in a proper place, is secured the beveled gear-wheel J. This shaft I is supported in the boxes $e$ and $e'$, which are secured to the beams A and A' at points a little forward of the boxes $c$ and $c'$. This shaft I extends beyond the boxes outward, on each side of the main frame, far enough to receive the pinions $f$ and $f'$, also the clutches $g$ and $g'$. The pinions are free to turn upon the shaft as the driving-wheels are revolved either backward or forward, and by either of the clutches $g$ and $g'$ the corresponding pinion may be made to turn the shaft, and with it the mechanism of the cutters.

The bevel-wheel J has a long barrel-hub, which slides upon the shaft I a limited distance, and it is secured to the shaft by a pin passing through it and the slots in the hollow hub of the said wheel J. This bevel-wheel has its cogs upon the inner or left-hand surface of it, and meshes in with a bevel-pinion, K, upon the crank-shaft L, by means of which motion is imparted to the cutters.

The bevel-wheel J is thrown in or out of gear with its pinion by the lever M, (represented at Figs. 4 and 2,) which is pivoted to the inner face of the beam A' just forward of the shafts of the driving-wheels. As it is pressed down the wedge-shaped portion of it forces the wheel J against the pinion K, and as it is raised up it frees the wheel J from contact with its pinion, and permits the spring $h$ upon the shaft I to force it back upon the said shaft. The latch $i$ on the forward end of the beam A' retains the lever M in its place when pressed down.

To the under side of the main frame, and crossing it at right angles a little to the rear of the boxes $c$ and $c'$, is secured the brace N, Fig. 2, of iron, which has upon its under surface the box $j$, in which the shaft of the pinion K is secured so as to revolve freely. This box is a long hollow cylinder, extending from the pinion K backward through the cross-beam B', and inclines upward from the pinion to the crank-wheel O. This wheel is firmly secured to the shaft, and carries the wrist-pin $l$, connecting it with the pitman P.

The pitman-rod is provided with a head, which is attached to the crank-wrist, and the other end of the rod is attached to the heel of the cutter-bar. The pitman rod and head are firmly screwed together, one entering the other, and then still further secured by a jam-nut at $k$. The head attached to the crank-wheel is represented at Figs. 6 and 8, which shows the construction and arrangement of the several parts.

$l$ is the wrist-pin, passing through the crank-wheel from the front side and the ring $m$, which turns freely upon it. The ring $m$ is supported in another larger ring, $n$, by two conical-pointed screws at opposite sides, and is capable of a limited motion on those two points as an axis, its outer corners being beveled or rounded for that purpose. The ring $n$ is supported, in the elongated ring formed by the expansion of the pitman-head by two pointed screws on opposite sides, and whose axes are at right angles to those that support the inner ring, $m$. By this device the pitman-head is secured very firmly to the wrist-pin, and at the same time the different parts will not be affected by any irregular motions of the cutter-bar either vertically or horizontally.

To each side of the pitman, where it is jointed to the cutter-bar, is a plate, $o$, of iron, fastened by a bolt, $p$, passing through all. These plates project beyond the pitman far enough to receive the heel of the cutter-bar between them, and they are pivoted to said heel by means of conical or conoidal points, which project into corresponding-shaped sockets, said points being secured to the heel of the cutter-bar, or to the plates $o$ $o$, as may be deemed most advantageous.

In order to render this form of joint effectual, it is required that the points and their sockets should be in constant contact, but not under sufficient pressure to produce much friction. I therefore employ a bolt, $q$, which passes through both plates $o$ $o$ and the pitman near its end. A screw-nut, $r$, serves to draw the plates toward each other, and they may thereby be adjusted with the utmost nicety; but the agitation resulting from rapid reciprocation will loosen a nut so placed, unless it is secured by some mechanical means, and a jam-nut, if used alone, will incur constant liability to tighten up the joint unintentionally. I therefore attach the plate $s$ by one end to the pitman, and let the bolt $q$ pass through its other end, so that said plate shall lie between the nut $r$ and its jam-nut $t$. It is then evident that the application of power to turn the jam-nut cannot exert any influence to cause the nut $r$ to turn on its axis and thus alter the tension of the joint.

To the rear end of the main frame, and on the outside of the beams A and A', are secured the boxes $o'$ and $o'$, which hold the shaft Q. This shaft has on one end a head, through which is a horizontal hole to receive the long bolt $p'$, which forms the axis of the shoe, and at the other end of the shaft is secured the lever $q'$.

The shoe R is made of the form represented in Figs. 1 and 2, and has attached to it the finger-bar S. It is secured by the bolt $p''$ passing through its ends and the head of the shaft Q to the machine, and is capable of a limited vertical movement, together with the finger-bar, upon the bolt $p'$ as an axis.

The lever $r'$ is centered also on the bolt $p'$, and attached by a chain to the hand-lever $s$, by means of which the outer end of the cutting apparatus may be raised from the ground at pleasure. The cutter-bar is kept in place by the guide-plate T, attached to the top of the shoe by screws. The edge of this guide-plate rests in a groove, $t'$, (see Fig. 2,) cut along the side of the heel of the cutter-bar, and its office is to keep said heel down in its place, and prevent the action of the pitman from raising it therefrom.

The shoe, as it is suspended by the shaft Q, may, together with the finger-bar, be turned upon the said shaft as a center by means of the lever $q'$, which is secured to the outer end of the shaft, and projects upward and forward, to be in reach of the driver. By this means the points of the cutters may be turned up or down, as is sometimes necessary, and they may be held in any desired position by placing the lever in any of the notches $x$ $x$.

The bolt $p'$ projects forward beyond the shoe R sufficiently far to permit of a standard for the support of the reel to be fastened to it, when it is desired to convert the machine into a reaper.

On the top of the beams A and A', at points a little to the rear of the boxes $c$ and $c'$, are inserted the posts $u$ and $u'$, of suitable height, which support the shaft of the foot-board U, and on which it may turn vertically to a limited extent. The other and forward end of the foot-board is sustained at any desired height by means of the arc V and pin $v$.

On the top of this foot-board, at each side, are fastened the braces $w$ and $w'$, which support the driver's seat, of the form represented in Fig. 2. These have the upper edge notched to receive and retain the seat in any position for the better balancing of the machine. The seat may be of almost any form, and may be slid backward and forward upon the braces by simply raising the rear end sufficiently to clear the notches in the same.

At the outer end of the finger-bar is the shoe Y, (see Fig. 10,) which is constructed with the vertical flange Z, to the inner side of which the divider is secured by screws or other suitable devices. To the outer side of the vertical flange Z is secured the joint of the adjustable caster-wheel $k'$, so that the said wheel may be still attached to the outer shoe after the divider has been removed, and may be employed while the machine is mowing, if desired.

The caster-wheel $k'$ has a horizontal joint, $l$, in its arm $m'$, between the center of the wheel and its vertical joint $n'$, by which it is connected to the shoe. By adjusting the joint $l'$ the arm $m'$ may be so set that the wheel $k'$ will carry the outer shoe at the desired distance above the ground; and when backing the machine, or turning it toward the standing grain, the wheel will swing upon its joint $n'$, and operate like any other caster-wheel.

The angle of the tongue T to the main frame may be regulated and changed at will by means of the lever $y$ and notched bar $z$, which passes through a suitable slot in the plate $d'$.

The weight of the driver may always be so adjusted as to tend to depress the front end of the machine, and by pressing the upper end of the lever $y$ away from him the front end may be raised up, and the rear end depressed.

The notches in the bar $z$ catch in the slot in the plate $d'$, through which said bar passes; and when the driver desires the rear end of the machine to be depressed, he accomplishes it by pressing the lever $y$ away from him, and thereby withdrawing the bar one or more notches, as desired, and the spring $x'$, lying beneath said bar, causes the last notch withdrawn to catch on the plate $d$ and retain the parts in that position, because there is always an upward pressure at the forward end of the tongue and a downward pressure at the forward end of the frame.

Having thus described my invention, what I claim, and desire to secure by Letters Patent of the United States, is—

1. The double-pivoted crank-wrist box, moving upon axes at right angles to each other, as set forth, so that the wrist-pin will not be cramped in its box by any irregular movement of the pitman, as set forth.

2. The pitman-joint at the heel of the cutter-bar, formed by the conical or conoidal points, and the plates $o\ o$, secured by the bolts $p\ q$ and stay-plates $s$, in the manner set forth.

3. Jointing the inner shoe of a harvester's cutting apparatus to a rocking shaft located transversely to and extending across the main frame, so that by moving said shaft upon its axis the points of the guard-fingers and cutters may be set high or low, as desired, substantially as shown and described.

4. In combination with the shoe R and rocking shaft Q, the lever $q'$ and the standard-rack $x$, for the purpose of permitting the adjustment and retention of said shoe and shaft in the desired position, as set forth.

5. Mounting the driver's seat upon two notched rails, $w\ w$, so that said seat may be shifted forward or backward when slightly raised at the back, substantially as set forth.

6. Pivoting the platform U at the tops of the posts $u\ u$ and adjusting its forward end at any desired height by the adjusting-bar V.

7. Arranging the two unequal-sized driving-wheels C and F with their axles about in the same vertical plane, so that neither wheel will drag when the machine is being turned, as at the field-corners.

8. The wedge-ended clutch-lever M, constructed and operating as set forth.

9. The notched bar $z$ and lever $y$, constructed and operated as set forth.

WILLIAM N. WHITELEY.

Witnesses:
   T. J. PRINGLE,
   CHARLES EVANS.